United States Patent [19]

Mizutani

[11] Patent Number: 4,707,168
[45] Date of Patent: Nov. 17, 1987

[54] CASE GUARD DEVICE FOR AIR FILTER AND LUBRICATOR OF COMPRESSED AIR SYSTEM

[75] Inventor: Masashi Mizutani, Takarazuka, Japan

[73] Assignee: Konan Electric Co., Ltd., Nishinomiya, Japan

[21] Appl. No.: 867,344

[22] Filed: May 23, 1986

[30] Foreign Application Priority Data

Aug. 21, 1985 [JP] Japan ................................. 60-126496
Aug. 30, 1985 [JP] Japan ................................. 60-131579

[51] Int. Cl.⁴ .............................................. B01D 46/00
[52] U.S. Cl. ...................................... 55/274; 55/435; 55/DIG. 17; 220/82 R
[58] Field of Search .......... 55/274, 435, 337, DIG. 17; 184/55.2; 220/82 R

[56] References Cited

U.S. PATENT DOCUMENTS

| | | | |
|---|---|---|---|
| 2,925,883 | 2/1960 | Everett | 55/274 X |
| 3,182,750 | 5/1965 | Gleason et al. | 220/82 R X |
| 3,578,407 | 10/1968 | Arnold et al. | 220/82 R X |
| 4,215,790 | 8/1980 | Ribble et al. | 220/82 R X |
| 4,234,014 | 11/1980 | Knight | 55/274 X |

Primary Examiner—Charles Hart
Attorney, Agent, or Firm—Jordan and Hamburg

[57] ABSTRACT

A case guard device for an air filter and a lubricator of a compressed air system having a main body connected to piping, and a transparent case formed of synthetic resinous material and attached to the main body. The case guard device includes a transparent case guard formed of synthetic resinous material open at its bottom and enclosing substantially the whole case while a gap is defined between the case and the case guard, and a retainer holding the case guard connected thereto by a projection-and-opening arrangement and latched onto the main body by bringing each of more than three locking portions into locking engagement with one of more than three pins on the main body.

11 Claims, 12 Drawing Figures

FIG. 10
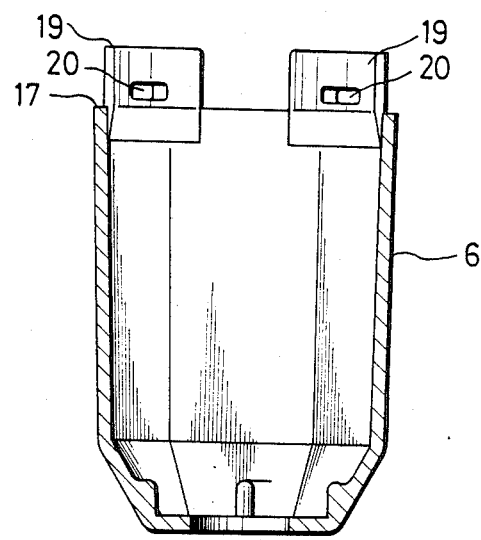
FIG. 11
FIG. 12
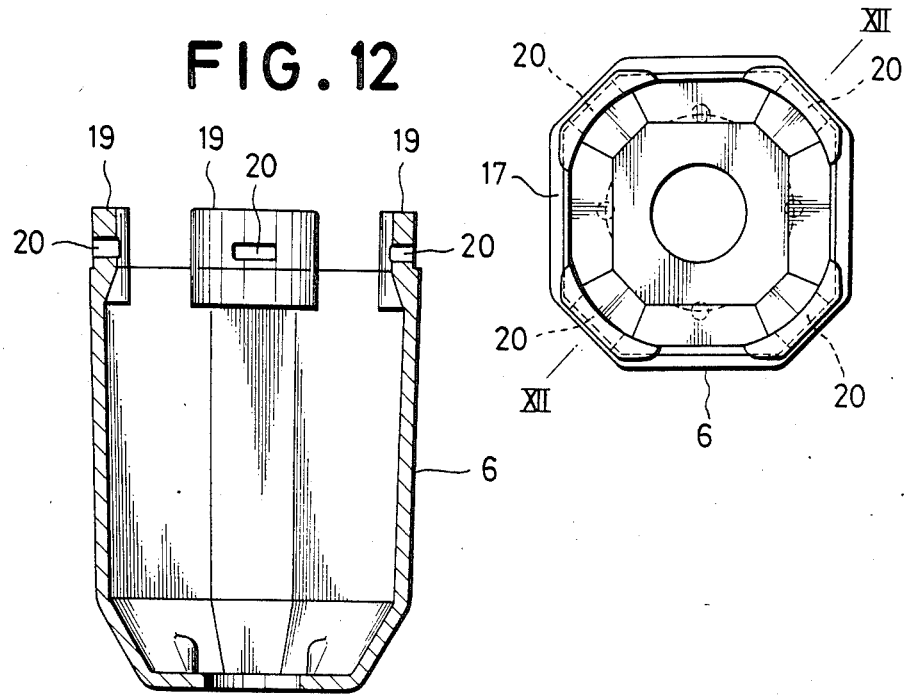

CASE GUARD DEVICE FOR AIR FILTER AND LUBRICATOR OF COMPRESSED AIR SYSTEM

FIELD OF THE INVENTION AND RELATED ART STATEMENT

This invention relates to a case guard device suitable for use with an air filter and a lubricator of a compressed air system having a main body connected to piping and a case for containing oil or water, which is adapted to be secured to the main body for enclosing the outer periphery of the case.

The case of the air filter and lubricator which is transparent has an internal pressure applied thereto. Such case might rupture when it suffers deterioration with time, and pieces into which it is broken might be scattered and injure the operator. To avoid this accident, it is usual practice to provide the case with a case guard. FIG. 1 shows a case guard 51 of the prior art which is formed of metal and has a plurality of openings 53 formed therein to allow the operator to look therethrough into the interior of the case guard 51 to learn the condition of the case 52.

Two problems are encountered in this type of case guard of the prior art. One of them is that if the openings 53 are small in size, it is impossible to ascertain the condition of the case 52 at a glance, and that if they are large in size, it is impossible to effectively prevent broken pieces of the case 52 from being scattered and injuring the operator. The other problem concerns the possibilities that sun's rays might be incident through the openings 53 on the case 52 and that solvents and other chemicals having deleterious effects on the case 52 might be brought into direct contact therewith through the openings 53. These occurrences would hasten deterioration of the case 52.

In attaching the case guard to the main body of an air filter and a lubricator, it has hitherto been usual practice to secure the case guard in place by threadably connecting a clamp ring to the main body of the air filter and lubricator. This suffers the disadvantage that it is time-consuming and troublesome to attach a case guard to an air filter and a lubricator.

OBJECTS AND SUMMARY OF THE INVENTION

This invention has been developed for the purpose of obviating the aforesaid problems of the prior art. Accordingly, an object of the invention is to provide a case guard for enclosing a case which enables the operator to learn at a glance the condition of the case and which enables trouble to be avoided that might be caused when the case might rupture.

Another object is to provide a case guard device which can be readily attached to and detached from the main body of an air filter and a lubricant in one operation.

To accomplish the aforesaid objects, the invention provides a case guard device comprising a case guard, transparent and formed of synthetic resinous material, which is formed with an opening at its bottom so as to enclose the whole of the case except at its bottom when it is attached to the main body while defining a gap between it and the case, and a retainer latched onto the main body and supporting the case guard.

The retainer is in the form of a frame for facilitating attaching the case guard to the main body, comprising a plurality of engaging projections located at its inner peripheral surface and each adapted to engage in one of a plurality of openings formed in the case guard, and more than three locking portions located at its outer peripheral surface and each adapted to engage and lock one of a plurality of pins located to the main body, so that the retainer holding the case guard can be readily latched onto the main body.

The retainer is formed of pliable material, such as a synthetic resinous material, and each of the locking portions has a relief recess greater in size than the head of each pin of the main body to avoid contact by the pin when the retainer is initially brough into contact with the main body, and a locking recess contiguous with the relief recess which smaller in size than the head of the pin but large enough to lock the pin in position to allow the retainer to be latched on to the main body. The relief recess and locking recess of each locking portion are located substantially concentrically with respect to the center of the retainer and the locking recess defines an opening slightly smaller in size than the diameter of the pin and has at one a reduced thickness portion.

The retainer can be latched on to the main body in one operation by bringing the same into engagement with the pins of the main body at the relief recess and then turning the retainer to bring the locking recesses into locking engagement with the pins.

The case guard device of the aforesaid construction according to the invention offers the following advantage. The case guard is transparent and makes it possible to readily see the condition of case. The provision of a gap between the case and the case guard which encloses the whole of the case increases the safety of the case and delays the development of deterioration. Whether the case enclosed by the case guard has suffered deterioration can be determined based on observations made on the case guard.

The use of the retainer enables the positioning of the case guard with respect to the case to be effected simultaneously as the retainer is latched on to the main body, and reduces the risk of damaging the case by an impact.

BRIEF DESCRIPTION OF THE DRAWINGS

FIG. 10 is a sectional view of the case guard;

FIG. 11 is a plan view of the case guard; and

FIG. 12 is a sectional view taken along the line XII—XII in FIG. 11.

DESCRIPTION OF THE PREFERRED EMBODIMENTS

Preferred embodiments of the invention will now be described by referring to the accompanying drawings.

Figures 1, 2:
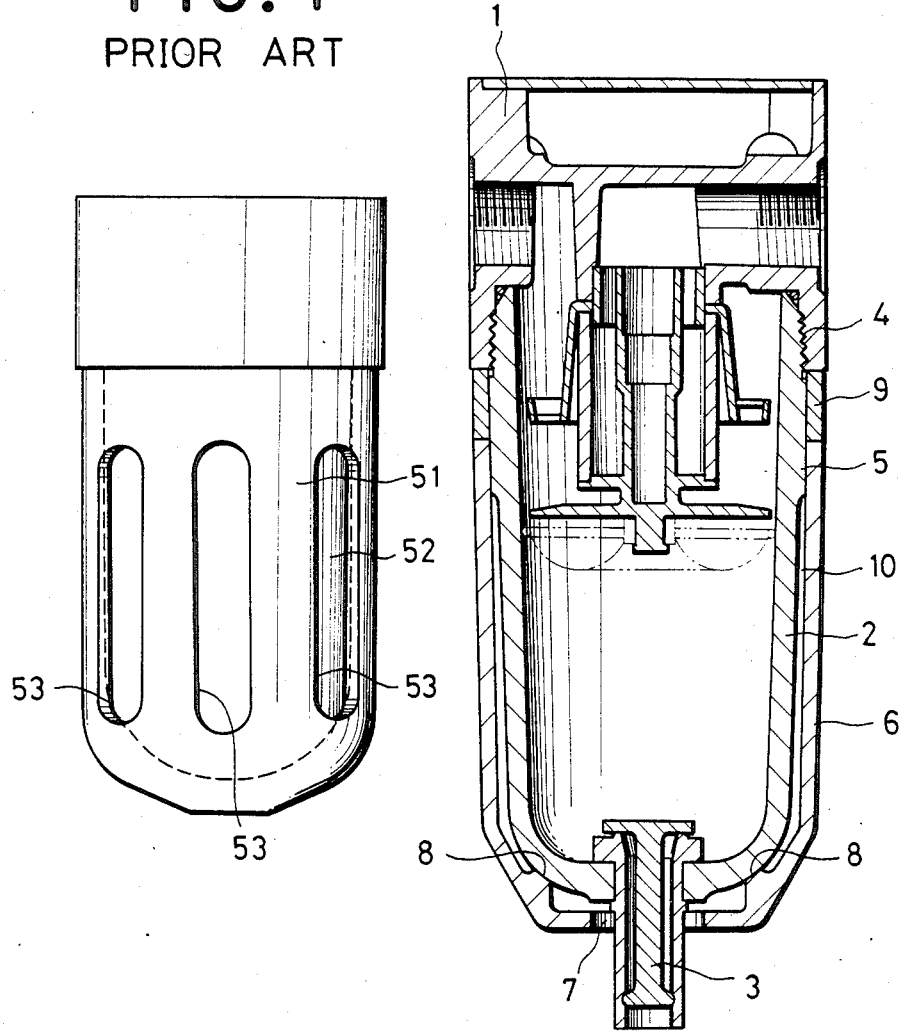
FIG. 1 is a front view of a case guard of the prior art.
FIG. 2 is a vertical sectional view of an air filter having attached thereto the case guard device according to the invention.

In FIG. 2, there is shown an air filter for a compressed air system comprising a main body 1 and a case 2 formed as a pressure vessel for collecting drainage. The case 2 is formed of synthetic resinous material and is transparent, so that its contents can be readily seen from outside. The numeral 3 designates a drainage for drawing the fluid collected in the case 2.

The case 2 is formed at the outer surface of its upper end portion with a threaded wall portion 4 so that the case 2 can be threadably connected to the main body 1. The case 2 has an increased thickness wall portion 5 located below the threaded wall portion 4 in adjacent relation.

A case guard 6 according to the invention is applied to the air filter of the construction described hereinabove. The case guard 6 which is formed to enclose the entire outer periphery of the case 2 is formed at its bottom with an opening 7 to allow the drainage 3 to extend therethrough from the case 32 to outside. The case guard 6 is formed with a plurality of projections 8 located at its inner peripheral surface near the opening 7. The case guard 6 of the aforesaid construction is transparent and formed of synthetic resinous material. In the embodiment shown, the case guard 6 is formed of soft resin. The case guard 6 is detachably attached at its upper end to a retainer 9. As will subsequently be described, the retainer 9 is latched on to the main body 1 through engaging means which is easy to operate.

The case 2 is maintained in contact with the case guard 6 at least at one portion of the increased thickness wall portion 5 and at the forward ends of the projections 8, and a gap 10 is defined between the case 2 and case guard 6 and maintained in communication with the atmosphere through the opening 7.

Being transparent, the case guard 6 allows one to see therethrough from outside from any angle to learn the condition of the contents of the case 2. With the case guard 6 enclosing the whole of the case 2 except at its bottom, it is possible to prevent, when the case 2 ruptures, broken pieces of the case 2 from being scattered in all directions. Moreover, since the case guard 6 prevents the case 2 from being exposed to the sun's rays, deterioration of the case 2 can be delayed. The provision of the gap 10 between the case 2 and case guard 6 which is maintained in communication with the atmosphere through the opening 7 allows compressed air to be released to the atmosphere through the gap 10 and opening 7 in the event that the case 2 ruptures. Thus safety is increased because no high pressure is applied to the case guard 6.

The invention is not limited to the specific form of the embodiment shown in FIG. 2 and described hereinabove, and many changes and modifications may be made therein. For example, the case guard 6 may be formed of any type of synthetic resinous material so long as the case guard is transparent, and the synthetic resin need not be soft. In attaching the case guard 6 to the main body 1 of the air filter, the use of the retainer 9 may be done without and the case guard may be directly attached to the main body by suitable means.

In the embodiment shown and described hereinabove, the case guard device according to the invention has been shown and described as being used with an air filter of a compressed air system. It is to be understood that the case guard filter according to the invention can be used with a lubricator as presently to be described.

Figure 4:
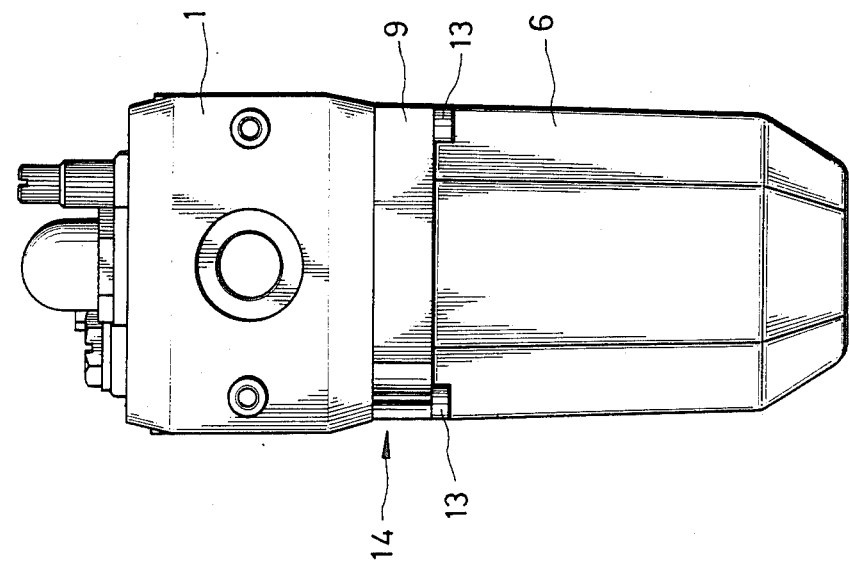
FIG. 4 is a side view of the lubricator equipped with the case guard as shown in FIG. 3.
Figure 3:
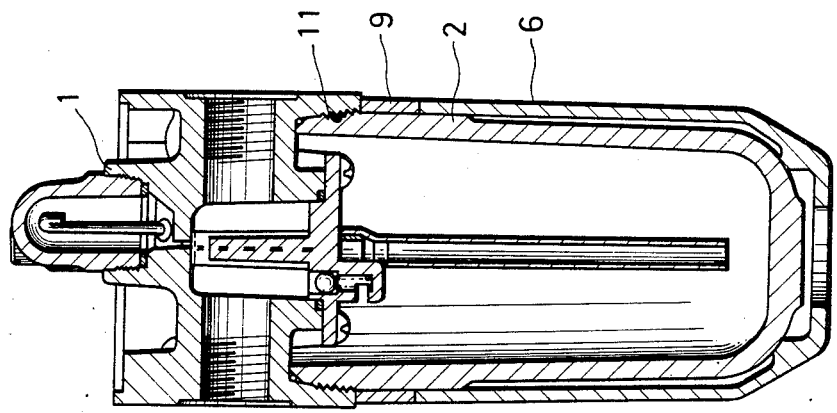
FIG. 3 is a vertical sectional view of a lubricator having attached thereto the case guard device according to the invention.
Figure 5:
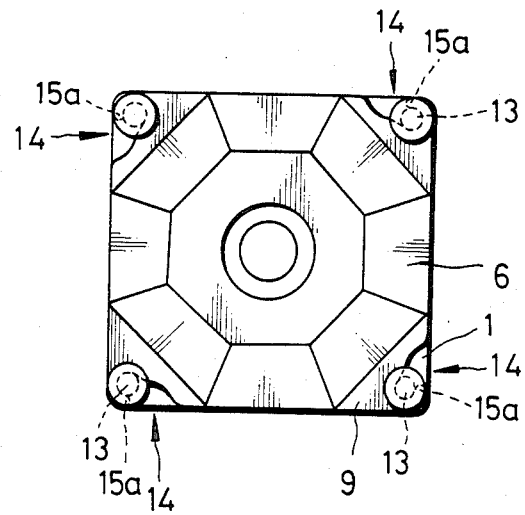
FIG. 5 is a bottom plan view of the lubricator equipped with the case guard as shown in FIG. 3.
Figure 6:
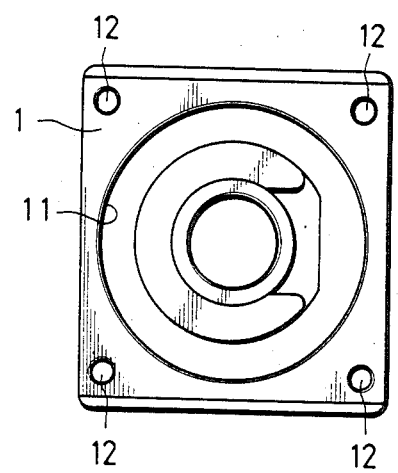
FIG. 6 is a bottom plan view of the main body of the lubricator.
Figure 7:
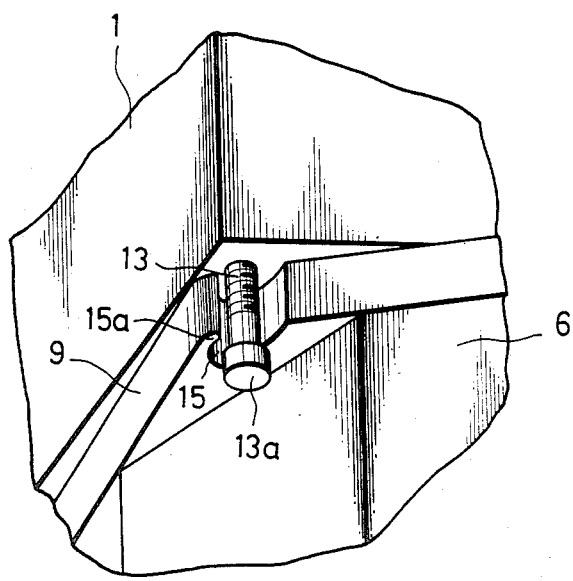
FIG. 7 is a fragmentary perspective view, as seen from below, of the main body of the lubricator and the case guard retainer as the retainer is being latched on to the main body.

Referring to FIGS. 3-5, the case 2 is threadably connected to the main body 1, and the case guard 6 is fitted to cover the case 2. The case guard 6 is secured to the main body 1 by means of the retainer 9. As shown in FIG. 6 which is a bottom plan view of the main body 1, the main body 1 is formed at the inner surface of the wall extending downwardly from its bottom surface at which the case 2 is secured, with a threaded portion 11 for threadably connecting the case 2. In the embodiment shown, the main body 1 is substantially square in configuration and is formed at its bottom surface with four threaded openings 12 each located in one of four corners for threadably receiving a pin 13 as shown in FIG. 7. The description of the internal structure of the main body 1 shall be omitted because it does not constitute a part of the invention.

Although the bottom surface of the main body 1 has been shown and described as being square in configuration, the invention is not limited to this specific configuration of the bottom surface of the main body 1 and it may be either circular or polygonal, without departing from the scope of the invention.

Figure 8:
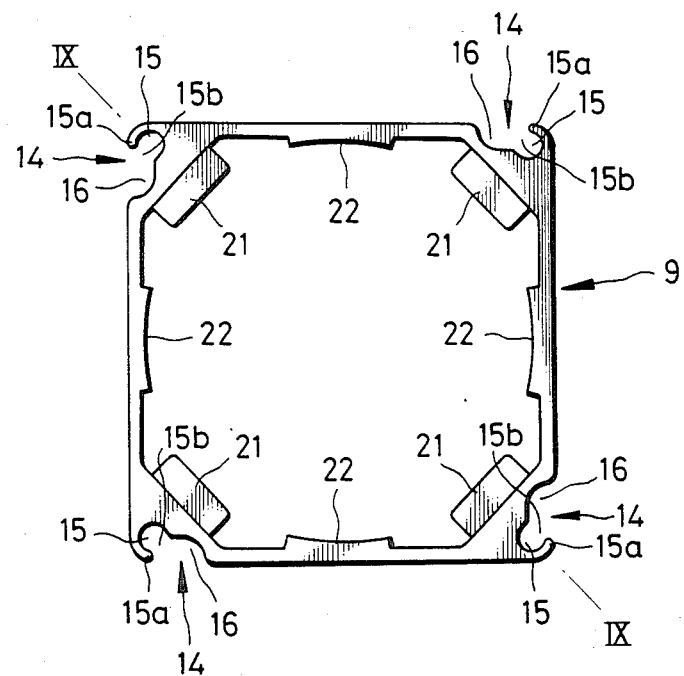
FIG. 8 is a plan view of the retainer according to the invention.
Figure 9:
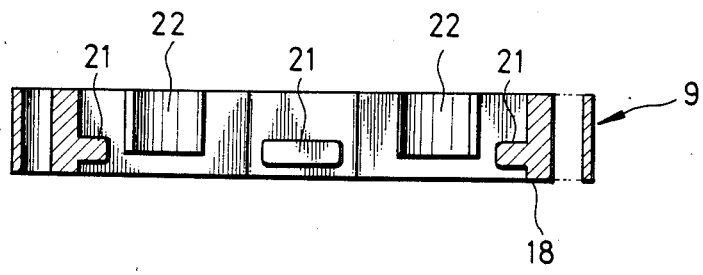
FIG. 9 is a sectional view taken along the line IX—IX in FIG. 8.

Referring to FIGS. 8 and 9, there is shown the retainer 9 formed of pliable material, such as synthetic resinous material, as a frame body substantially corresponding in configuration to the bottom surface of the main body 1. The retainer 9 is formed at its outer peripheral surface with four locking portions 14 each located in one of four corners in positions corresponding to those of the pins 13 of the main body 1. Although the locking portions 14 have been described as being four in number, the invention is not limited to this specific number of locking portions 14 and they may be of any number as desired so long as they are more than three in number.

Each locking portion 14 has a locking recess 15 smaller in size than a head 13a of each pin 13 (when it is circular, its diameter is smaller than that of the head 13a), and a relief recess 16 contiguous with the locking recess 15 and greater in size than the head 13a of the pin 13. The relief recess 16 is open at the outer peripheral surface of the retainer 9, but it may be in the form of a hole closed at its outer side. The relief recess 16 and locking recess 15 of the locking portion 14 each has a center located substantially concentrically with respect to the center axis of the retainer 9. When the pin 13 is locked in position at the locking recess 15, the outer peripheral surface of the retainer 9 is disposed in a position substantially corresponding to that of the main body 1. However, when the pin 13 is located in the relief recess 16, the retainer 9 is located in a position in which it is slightly rotationally displaced about the center axis of the main body 1 so that its outer peripheral surface is out of alignment with that of the main body 1, as shown in FIG. 7. The locking recess 15 which defines an opening 15b for receiving the pin 13 has a reduced thickness portion 15a at one end. The opening 15b is slightly smaller in size than the diameter of the pin 13. The reduced thickness portion 15a is sufficiently flexible to allow the pin 13 to be engaged and released from engagement with the locking recess 15. Thus, by bringing the pins 13 of the main body 1 into engagement with the respective relief recesses 16 and then turning the retainer 9 about its center axis, each pin 13 can be smoothly brought into locking engagement with the corresponding locking recess 15 as the reduced thickness portion 15a at one end thereof is flexed outwardly by the pin 13. The pins 13 are dimensioned such that they can support the retainer 9 between their heads 13a and the main body 1 while they are threaded into the main body 1. Thus, the retainer 9 is latched on to the main body 1 as the pins 13 are brought into locking engagement with the locking recesses 15 of the locking portions 14 and prevented from being dislodged therefrom. FIG. 5 shows the manner in which the retainer 9 is securedly latched on to the main body 1.

The inner periphery of the retainer 9 has a configuration corresponding to that of a portion of the inner periphery of the case guard 6 at which the latter is connected to the former. The case guard 6 is securedly connected to the retainer 9 with an upper end face 17 of the former being positioned against a bottom surface 18 of the latter, as shown in FIGS. 10-12. More specifically, the upper end face 17 of the case guard 6 has lugs 19 projecting upwardly therefrom and each formed therein with an opening 20, and the retainer 9 is formed with engaging members 21 projecting inwardly from the inner periphery in positions corresponding to those of the openings 20 when the case guard 6 is connected to the retainer 9. By utilizing the flexing of the lugs 19, the engaging members 21 of the retainer 9 are brought into engagement in the respective openings 20 of the case guard 6, to thereby securedly connect the case guard 6 to the retainer 9 to provide a unitary structure. The case guard 6 is preferably formed of pliable material, such as a soft plate formed of synthetic resinous material.

The retainer 9 is formed at its inner periphery with projections 22 each having an arcuate surface 22 adapted to engage the outer periphery of the case 2 so as to effect positioning of the retainer 9 relative to the case 2.

The outer periphery of the case guard 6 is octagonal. However, the invention is not limited to this specific form of the outer periphery of the case guard 6.

From the foregoing description, it will be apparent that the retainer 9 having the case guard 6 securedly connected thereto can be latched onto the main body 1 in one operation by first bringing the pins 13 of the main body 1 into engagement with the relief recesses 16 of the engaging portions 14 of the retainer 9 and then turning the retainer 9 about its center axis to bring the pins 13 into locking engagement with the locking recesses 15 of the respective locking portions 14 of the retainer 9.

What is claimed is:

1. A case guard device for an air filter and a lubricator of a compressed air system, comprising a main body adapted to be connected to piping and a transparent case attached to the main body, said case guard device comprising:
   a transparent case guard of synthetic resinous material, said case guard having a bottom with an opening therein and being shaped to enclose the whole of the case except at the bottom of the case, the case guard and the case being so configured as to form a gap between the case guard and the case; and
   a connecting means for connecting said case guard to said main body.

2. A case guard device as claimed in claim 1, wherein said connecting means comprises a retainer interposed between the main body and the case guard, said retainer being latched onto the main body while supporting the case guard.

3. A case guard device as claimed in claim 2, wherein said retainer is comprised of a frame member of pliable material, said retainer having more than three engaging projections formed at the inner periphery thereof and being adapted to be brought into engagement in corresponding openings formed at an outer periphery of said case guard so that the case guard can be securely connected to the retainer, the outer periphery of said retainer being formed with more than three locking portions each adapted to come into locking engagement with one of a plurality of pins on the main body, each said locking portion comprising a relief recess greater in size than a head of the pin to avoid locking engagement with the pin when the retainer is brought into contact with the main body, and a locking recess contiguous with the relief recess and smaller in size then the head of the pin to lock the pin in position when the retainer is turned about the center axis thereof after the relief recesses are brought into contact with the respective pins, each said relief recess and each said locking recess being substantially concentric with the retainer and the locking recess defining an opening smaller in size than the diameter of the pin for receiving the pin and having a reduced thickness portion at one end.

4. A case guard device as claimed in claim 1, wherein said case is threaded to said main body.

5. A case guard device as claimed in claim 1, wherein said case guard is held to said main body separately of said case.

6. A case guard device as claimed in claim 1, wherein said case guard has a plurality of internally projecting projections about the periphery of said opening, said projections engaging said case.

7. A case guard device as claimed in claim 1, wherein said connecting means comprises a retainer affixed to said case guard and releasably mounted to said main body, said case being held to said main body independently of said retainer, said retainer surrounding said case.

8. A case guard device as claimed in claim 7, wherein said retainer is snap fit to said case guard.

9. A case guard device as claimed in claim 7, wherein said retainer has projecting means engaging said case for positioning said retainer with respect to said case.

10. A case guard device as claimed in claim 1, wherein said case has an externally threaded open end portion threaded to said main body, and a thickened wall thickness portion adjacent said open end portion engaging said case guard, whereby said gap extends from said thickened portion toward the end of said case opposite said open end.

11. A case guard device as claimed in claim 1, wherein said case is held to said main body by a threaded end portion thereof, said case engages said case guard at a second portion thereof adjacent said threaded end portion, said case guard has projecting means engaging said case adjacent said opening, and said gap extends between said second portion and said projecting means.

* * * * *